(12) United States Patent  (10) Patent No.: US 6,641,857 B2
Miller et al.                 (45) Date of Patent: *Nov. 4, 2003

(54) CHOCOLATE-BASED FAT SYSTEM HAVING IMPROVED ORGANOLEPTIC PROPERTIES

(76) Inventors: Van Miller, P.O. Box #100, Norval Ontario (CA), L0P 1A0; Vladimir Miller, 24 Framingham Dr., Thornhill Ontario (CA), L3T 4H3; Edward Choy, 26 Framingham Dr., Thornhill Ontario (CA), L3T 4H3

( * ) Notice: Subject to any disclaimer, the term of this patent is extended or adjusted under 35 U.S.C. 154(b) by 0 days.

This patent is subject to a terminal disclaimer.

(21) Appl. No.: 10/061,339

(22) Filed: Feb. 4, 2002

(65) Prior Publication Data

US 2002/0081359 A1 Jun. 27, 2002

Related U.S. Application Data

(62) Division of application No. 09/661,144, filed on Sep. 13, 2000, now Pat. No. 6,368,655.

(51) Int. Cl.[7] ................................................. A23G 1/00
(52) U.S. Cl. ........................................ 426/631; 426/660
(58) Field of Search .................................. 426/631, 660

(56) References Cited

U.S. PATENT DOCUMENTS

| | | |
|---|---|---|
| 3,895,105 A | 7/1975 | Colter |
| 3,959,516 A | 5/1976 | Warkentin |
| 4,078,093 A | 3/1978 | Girsh |
| 4,701,337 A | 10/1987 | Frost |
| 5,447,735 A | 9/1995 | Miller |
| 5,464,649 A | 11/1995 | St. John |
| 5,474,795 A | 12/1995 | Sturber |
| H1527 H | 4/1996 | Moore |
| 5,505,982 A | 4/1996 | Krawczyk |
| 5,518,754 A * | 5/1996 | Miller et al. ................. 426/611 |
| 5,585,135 A | 12/1996 | Patterson |
| 5,591,474 A | 1/1997 | Miller |
| 5,626,900 A | 5/1997 | Miller |
| 6,368,655 B1 * | 4/2002 | Miller et al. ................. 426/631 |

OTHER PUBLICATIONS

Minifie 1980 Chocolate, Cocoa and Confectionery: Science and Technology 2nd edition AVI Publishing Co., Inc. Westport CT P 105–126, 362–364.
Minifie 1989 Chocolate, Cocoa and Confectionery: Science and Technology AVI Publishing Co., New York P146–148.
Corriher 1997 Cookwise William Morrow & Co., Inc New York P460–463.
Turgeon et al (editors) 1961 Larousse Gastronomique Crown Publishers, Inc. New York P 942–944.
Wolf–Choen 1994 Step–by–Step Irresistable Chocolate Smithermark Publishers Inc. New York P 8, 9, 12, 14, 16, 17, 54.

* cited by examiner

*Primary Examiner*—Carolyn Paden
(74) *Attorney, Agent, or Firm*—Marks & Clerk

(57) ABSTRACT

An edible anhydrous chocolate-based fat system is provided, having a significant granulated sugar component. This provides an unusual mouth sense, and allows for significantly different organoleptic properties of the chocolate-based fat system—which otherwise emulates chocolate. The chocolate may be light or dark, or white chocolate. An additional sweet flavor may be added to the chocolate-based fat system, allowing for a faster release of the additional flavor, by infusing or saturating the granulated sugar component of the fat system with the additional flavor. Typically, the granulated sugar component is saturated with an essential oil of a chosen flavor. Apart from the granulated sugar component, the remaining ingredients of the chocolate-based fat system are conched in the usual manner in keeping with chocolate production techniques. A process for production of the edible anhydrous chocolate-based fat system is discussed, and typical machinery for carrying out that process is shown.

14 Claims, 1 Drawing Sheet

CHOCOLATE-BASED FAT SYSTEM HAVING IMPROVED ORGANOLEPTIC PROPERTIES

CROSS-REFERENCE

This application is a Divisional Application of application Ser. No. 09/661,144 which was filed Sep. 13, 2000 by the inventors herein now U.S. Pat. No. 6,368,655.

FIELD OF THE INVENTION

This invention relates to a new chocolate-based fat system which has improved organoleptic properties. Specifically, the present invention relates to an edible anhydrous chocolate-based fat system having a granulated sugar component which provides the improved organoleptic properties, and which also results in a distinctly different mouth sense. In a particular embodiment of the present invention, the edible anhydrous chocolate-based fat system is flavor infused with an additional sweet flavor, which is brought into the chocolate-based fat system by way of flavor-saturated granulated sugar.

BACKGROUND OF THE INVENTION

Chocolate has been known in many forms for many years. Traditional forms of chocolate include dark, light, white, and milk chocolates which may be used as a snack item or confection, or for coating other food items. More recently, chocolate has been utilized not only as a flavor but in chip or chunk form as an additive in baked goods and flour confections such as cookies and the like. Finally, chocolate endures almost universal appeal simply for its flavor, its mouth feel—generally, confection chocolates are based on fat systems which melt easily in the mouth, whereas chocolate chips and the like are based on harder fat systems so as to retain their integrity during the baking process—and because of its relatively easy portability. Chocolate may be packaged or wrapped in relatively small portions, for consumption as a snack, for example.

However, until now all chocolate products where chocolate is a principal constituent, and where the chocolate is presented as a stable fat system at room temperature, have been smooth and with a distinct chocolate flavor. That flavor may range from quite sweet to bitter, depending on the sugar content, and whether or not the chocolate is a milk chocolate, light or dark brown chocolate, or white chocolate. Some chocolates may be flavored, typically by the use of mint; but all chocolates are highly conched—that is, they have a high degree of fineness.

Of course, the degree of fineness may be controlled by varying the mechanical pressure on the conching rollers, but chocolate is nonetheless a fine and smooth consistency fat system, in all of its embodiments. Usually, therefore, in order to impart an additional flavor to chocolate, so as to create a different taste sensation, the chocolate is used to coat another item having that other flavor, and the flavor combination is determined organoleptically in the mouth, as the product is eaten and the flavors of the chocolate and the other item mix together. However, if the additional flavor comes from an item such as a peanut—chocolate coated peanuts, for example—the flavor release and mixture may be quite slow; on the other hand, if the additional flavor is a creme filling such as a fruit or sweet syrup flavor, or a liqueur flavor, that flavor is organoleptically released very quickly, and may—and generally does—overwhelm the flavor of the chocolate.

The present inventors have discovered, quite unexpectedly, that a very different mouth sense can be obtained, which mouth sense is quite pleasant, by incorporating coarse sugar into a chocolate formulation which otherwise is constituted as highly refined chocolate, after the conching step and before the product is molded or otherwise manufactured for further use or consumption.

Still further, the inventors herein quite unexpectedly discovered that chocolate-based products can be produced having additional sweet flavor incorporated therein, and with an improved organoleptic property, by incorporating flavor infused granulated sugar into the chocolate-based fat system. That additional sweet flavor is generally derived by saturating the granular sugar with essential oils, or by centrifuging moisture away from highly sweetened juices. The details of such additional flavored sugars are discussed hereafter.

It will be noted hereafter that traditional chocolate equipment, that is chocolate which is used to mold chocolate into chocolate chips and the like, or to enrobe chocolate on other items, cannot be used with the chocolate-based fat system of the present invention, due to the inherent granularity of that chocolate system as a consequence of the granulated sugar component thereof. All of the piping, pumping, nozzle orifice sizes, and so on, in ordinary chocolate handling equipment, are sized and dimensioned so as to accommodate very fine particle sizes as are found in ordinary chocolate which is highly conched.

DESCRIPTION OF THE PRIOR ART

MILLER U.S. Pat. No. 5,447,735, issued Sep. 5, 1995, teaches a sweet cinnamon or other flavored fat-based anhydrous flake. The fat-based product is particularly intended as a flavoring additive for incorporation into baked goods and flour confections, or as a principal component in snack items which may be produced by being molded together with a baked flour-based sweet biscuit. The product consists of a bakery-compatible oil or fat system which is cooled and set at relatively low temperatures so as to be firm and stable at room temperatures.

MILLER U.S. Pat. No. 5,591,474 issued Jan. 7, 1997, teaches a method of preparation of chocolate crumb. The invention is particularly directed to the preparation of chocolate crumb for use in the manufacture of milk chocolate, and comes about by caramelizing a portion of the sugar content and hydrating it with a portion of the milk to be used in the process. The thus produced caramelized slurry batch is added to the remainder of the milk to be used in the formulation of the chocolate crumb, and the remaining water is driven off to produce a dried mix which is thereafter mixed with cocoa butter and anhydrous cocoa liquor. Additional anhydrous butter fat can be also added to the crumb, if necessary, to bring the fat content to a predetermined level.

A further patent issued to MILLER, U.S. Pat. No. 5,626,900 dated May 6, 1997, teaches another method for preparation of chocolate crumb and a precursor component therefor. In this invention, molasses or brown sugar is hydrated with milk, then dried, and processed by the addition of the balance of sugar, fats, cocoa butter, and cocoa liquor if used. That precursor component is then set aside for subsequent pasting and conching so as to result in the production of milk chocolate.

SUMMARY OF THE INVENTION

A purpose of the present invention is to provide a chocolate-based fat system having an improved organoleptic quality, whereby a new mouth sensation is created. It has essentially the same constituent analysis as ordinary chocolate, but displays a distinct crunchiness, a fat system which may be used as a snack item, but more particularly as a flavoring additive to baked goods and flour confections, and ice cream.

A further object of the present invention is to provide such a chocolate-based fat system as discussed immediately above, where the product has an additional sweet flavor imparted thereto.

Thus, a purpose of the present invention is to provide chocolate-based fat systems as described above, which may be molded in a mold or spread onto a belt for manufacture into flake or chunk products, easily and economically.

To that end, the present invention provides an edible anhydrous chocolate-based fat system which may be molded in a mold or spread onto a belt for manufacture into flake or chunk products, and which comprises not more than 2% by weight of water—so as to be thereby described as being anhydrous or essentially anhydrous. More particularly, the chocolate-based fat system comprises about 10% to about 15% by weight of chocolate liquor, from about 15% to about 25% by weight of cocoa butter, and from about 45% to about 60% by weight of sugar. However, a component of the sugar, being from about 5% to about 30% by weight, is granulated sugar. The remaining ingredients of the chocolate-based fat system in keeping with the present invention, apart from the granulated sugar component, have been conched.

In a particular variant of the present invention which is directed to the production of a white chocolate-based fat system, the chocolate liquor may be substituted by a further appropriate amount of cocoa butter or other compatible fats, as is well known to those skilled in the art of the production of chocolate.

In a particular alternative embodiment of the present invention, at least one additional food ingredient may be chosen from the group consisting of milk solids, milk fat, vanilla, salt, lecithin, and mixtures thereof. The at least one additional food ingredient is also conched together with the remaining ingredients, apart from the granulated sugar component.

A more general alternative embodiment of the present invention provides that the granulated sugar component has been saturated by an additional sweet flavor, so as to infuse the edible anhydrous chocolate-based fat system with that additional sweet flavor.

The granulated sugar component of the edible anhydrous chocolate-based fat system of the present invention may have been saturated by an essential oil chosen from the group of essential oils which consists of orange, lemon, almond, vanilla, cappuccino flavor, rose flavor, cherry, raspberry, strawberry, peach, mocha flavor, and combinations thereof.

The manner by which the granulated sugar component has been saturated by the chosen essential oil may, in keeping with the further provision of the present invention, have come as a consequence of the essential oil having been processed through a centrifugal pump together with the granulated sugar.

A still further embodiment of the present invention provides for the granulated sugar component to have been saturated by a flavor chosen from the group consisting of orange, lemon, avocado, passion fruit, mango, kiwi, cherry, raspberry, strawberry, peach, and combinations thereof. The granulated sugar and then the highly sweetened juice is centrifuged so as to remove the moisture therefrom and so as to derive a flavor infused granulated sugar.

Of course, the chocolate-based fat system of the present invention may be intended for incorporation into baked flour goods and flour confections, or ice cream, and as such it is produced in the form of flakes or chunks.

The present invention also provides a process for the preparation of an edible anhydrous chocolate-based fat system, and comprises the steps of:

(a) Supplying about 10% to about 15% by weight of chocolate liquor, and from about 15% to about 25% by weight of cocoa butter.

(b) Supplying a first quantity of sugar in the amount of about 15% to about 55%, by weight.

(c) Supplying a second quantity of sugar in the amount of about 5% to about 30% by weight.

At least the second quantity of the sugar is granulated sugar, and the total amount of the first quantity of the sugar together with the second quantity of the sugar is in the range from about 45% to about 60% by weight. The following further steps are also included:

(d) The chocolate liquor, cocoa butter, and the first quantity of sugar are mixed together and conched to a predetermined degree of fineness. This step thereby produces a conched chocolate pre-mix.

(e) The second quantity of sugar is then added to the conched chocolate pre-mix, and they are mixed together at a temperature which is in the range of about 5° C. to about 30° C., so as to produce a cool anhydrous chocolate-based fat system having a specific, predetermined formulation with about 10% to about 15% by weight of chocolate liquor, about 15% to about 25% by weight of cocoa butter, and about 45% to about 60% by weight of sugar.

(f) The cool anhydrous chocolate-based fat system is then transferred to a discrete particle manufacturing means so as to produce discrete particles of the anhydrous chocolate-based fat system. The discrete particle manufacturing means is operated at a temperature of about 5° C. to about 30° C.

(g) Finally, the discrete particles of the anhydrous chocolate-based fat system are removed for further handling and/or storage and/or shipping.

If necessary and appropriate, the process described above can comprise a further step as follows:

(h) After step (d), the conched chocolate pre-mix is cooled, if necessary, to a temperature of about 5° C. to about 30° C.

Typically, step (e) is carried out in a dry blender.

The discrete particle manufacturing means may be a chocolate mold for producing molded particles or chunks of the edible anhydrous chocolate-based fat system. Alternatively, the discrete particle manufacturing means may comprise means for spreading the cool anhydrous chocolate-based fat system on a conveyor belt, and means for cutting or scoring the spread anhydrous chocolate-based fat system so as to form chunks or flakes thereof.

It will be understood, of course, that the particularities of the formulation of the edible anhydrous chocolate-based fat system which is manufactured in keeping with the process of the present invention, are the same as previously described. The formulation may comprise at least one additional food ingredient chosen from the group consisting of milk solids, milk fat, vanilla, salt, lecithin, and mixtures thereof; and when the formulation includes that additional food ingredient, all of the ingredients forming the chocolate-based fat system apart from the second quantity of sugar, are conched together.

As described above, the manner in which the second quantity of sugar has been saturated with the additional flavor, if an additional flavor is to be present, include saturating the sugar with an essential oil, such as by processing the chosen essential oil and the second quantity of sugar through a centrifugal pump together; or by producing a highly sweetened juice and then centrifuging the highly sweetened juice so as to remove the moisture therefrom.

Also, as described above, the process of the present invention is applicable to the production of a white edible anhydrous chocolate-based fat system by substituting the chocolate liquor in the formulation with an appropriate additional amount of cocoa butter, or cocoa butter together with a compatible fat.

BRIEF DESCRIPTION OF THE DRAWINGS

The novel features which are believed to be characteristic of the present invention, as to its structure, organization, use and method of operation, together with further objectives and advantages thereof, will be better understood from the following drawings in which a presently preferred embodiment of the invention will now be illustrated by way of example. It is expressly understood, however, that the drawings are for the purpose of illustration and description only and are not intended as a definition of the limits of the invention. Embodiments of this invention will now be described by way of example in association with the accompanying drawings in which.

DETAILED DESCRIPTION OF THE PREFERRED EMBODIMENTS

Figure 1:
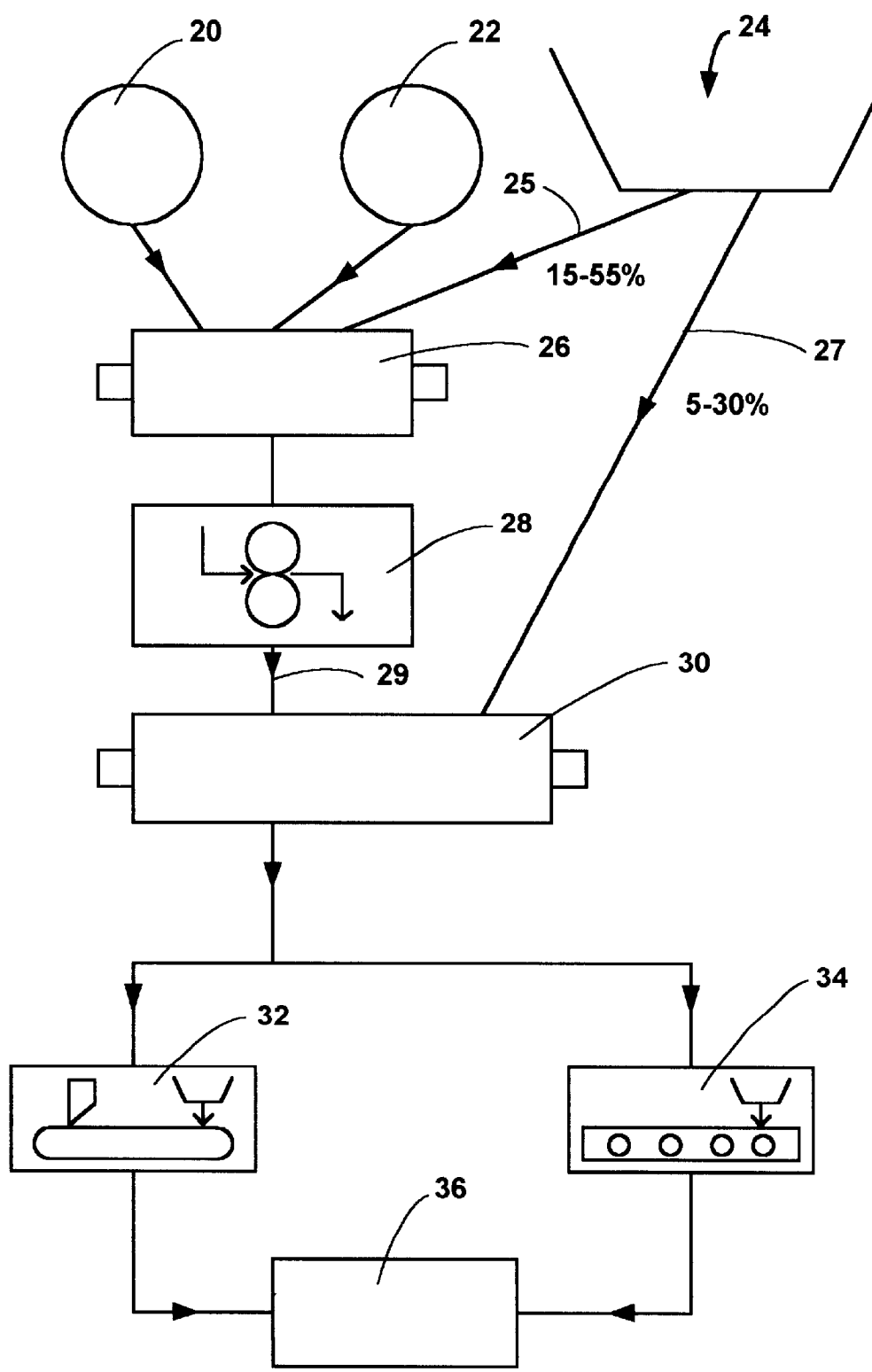
FIG. 1 is a diagrammatic representation of the flow of ingredients through a typical manufacturing process for edible anhydrous chocolate-based fat systems in keeping with the present invention.

Traditional chocolate and compound chocolate has a high degree of fineness imparted to it as a consequence of the conching step to which all chocolate ingredients are subjected during preparation and manufacture of the chocolate. Essentially, high mechanical pressure, to a predetermined amount, is imparted to the dry solids of the chocolate as they are passed between conching rollers, in the presence of cocoa butter or an appropriate vegetable oil or hard butter. Those products are, of course, anhydrous—that is to say, there is no discernable or appreciable moisture content—and the mechanical pressure imparted as the ingredients pass through the conching rollers can only reduce the solids particles to a particular fineness. Thus, the amount of fineness of the particles which go to constitute the formulation of the chocolate, is in direct relationship to the mechanical reduction of the particles. This, of course, affects the organoleptic properties of the chocolate—in other words, the manner in which the flavors are released in the mouth, as well as the mouth sense of smoothness. Organoleptic dissolution of food substances in the mouth occurs as a consequence of the ability of the food substance to attract moisture in the mouth—the saliva—and to dissolve therein. The faster the dissolution of the food substance, the faster the release of flavor. This phenomenon is particularly of interest in the present invention, as it affects the release of sweetness and the release of additional flavors which come as a consequence of granulated sugar being saturated with essential oils.

It follows that the presence of granulated sugar in a chocolate-based fat system creates a different mouth sense and flavor release, with a faster impression of sweetness being imparted to the chocolate, and/or with a faster release of an additional flavor being released together with the flavor of the chocolate.

Thus, the present invention provides an edible anhydrous chocolate-based fat system for eating and/or cooking purposes. The fat system effectively is a chocolate, which may be light, dark, or white, and is typically molded or produced in chunks or flakes. Particularly, therefore, the edible anhydrous chocolate-based fat system of the present invention may be used as a snack item, but more particularly as a flavoring ingredient for use in association with baked goods and flour confections such as cakes, cookies, and the like, or as a flavor additive to ice cream products.

Because the edible anhydrous chocolate-based fat system of the present invention is anhydrous, there is no moisture added at any time during its production. However, it may be possible for moisture to come into the formulation inadvertently, along with other ingredients which are employed in the formulation of the product, and as a consequence the chocolate-based fat system of the present invention may comprise from 0 up to about 2% by weight of water.

More particularly, the edible anhydrous chocolate-based fat system of the present invention will typically comprise from about 10% to about 15% by weight of chocolate liquor, from about 15% to about 25% by weight of cocoa butter, and from about 45% to about 60% by weight of sugar.

If the chocolate-based fat system in keeping with the present invention is to be a white chocolate, then the chocolate liquor will be substituted by an additional amount of cocoa butter, or cocoa butter together with another compatible fat or butter.

In any event, an important feature of any edible anhydrous chocolate-based fat system in keeping with the present invention is that a component which comprises about 5% to about 30% by weight of the product is granulated sugar—that granulated sugar, of course, being an integral part of the overall sugar content of the chocolate-based fat system.

It is also an important feature of the present invention, and follows from the statement made immediately above, that the remaining ingredients of the edible anhydrous chocolate-based fat system apart from the granulated sugar component, have been conched.

As may be typical in the chocolate industry, an edible anhydrous chocolate-based fat system in keeping with the present invention may further comprise at least one additional food ingredient which is chosen from the group consisting of milk solids, milk fat, vanilla, salt, lecithin, and mixtures thereof. However, that at least one additional food ingredient is conched together with the remaining ingredients apart from the granulated sugar component.

To add an additional flavor to the chocolate-based fat system of the present invention, the granulated sugar component thereof may be saturated by an additional sweet flavor, so as to thereby infuse the edible anhydrous chocolate-based fat system with an additional sweet flavor. Typically, in such circumstances, the granulated sugar component has been saturated by an essential oil which is chosen from the group of essential oils consisting of orange, lemon, almond, vanilla, cappuccino flavor, rose flavor, cherry, raspberry, strawberry, peach, mocha flavor, and combinations thereof. The derivation of such flavored essential oils is, of course, outside the scope of the present invention.

However, a typical manner by which the granulated sugar component is saturated with a chosen essential oil is by processing the sugar and the essential oil through a centrifugal pump together.

Another manner by which the granulated sugar component can have been saturated by a flavor which is chosen from the group consisting of orange, lemon, avocado, passion fruit, mango, kiwi, cherry, raspberry, strawberry, peach, and combinations thereof, is for the granulated sugar to be mixed together with a juice of the chosen flavor so as to derive a highly sweetened juice. Then, the highly sweetened juice is centrifuged, so as to remove the moisture therefrom, and so as to thereby derive a flavored granulated sugar.

The present invention provides a process for the preparation of an edible anhydrous chocolate-based fat system in keeping with the present invention. The following discussion of that process is directed to a typical chocolate-based fat system which includes chocolate liquor, together with cocoa butter and sugar; it will be understood, of course, that the additional ingredients such as milk solids, milk fat, vanilla, salt, lecithin, or mixtures thereof, or if the chocolate-based fat system is intended to emulate white chocolate, appropriate substitutions and additions to the formulation of the edible anhydrous chocolate-based fat system being manufactured can be made, as previously discussed.

The process for preparation of an edible anhydrous chocolate-based fat system in keeping with the present invention will now be described, particularly in association with the accompanying figure of drawings. Of course, it will be understood that FIG. 1 is schematic, and is not intended to represent any storage devices or manufacturing machinery with any particularity, because for the most part such storage devices, delivery devices, and manufacturing devices, are known to persons skilled in the art. However, a caution must be made that it will be clearly understood that typical chocolate handling equipment, particularly such equipment which is manufactured to accommodate the very fine particle size materials of typical chocolate products, are not appropriate for use in association with the present invention without modification. This is because all such equipment, piping, pumping, nozzle orifices, and the like, are sized to accommodate the very fine particles of highly conched chocolate, but will not accommodate the chocolate-based fat system of the present invention due to the granularity of the granular sugar component thereof.

Turning now to FIG. 1, a typical schematic and materials flow diagram for production of an edible anhydrous chocolate-based fat system in keeping with the present invention is shown at 10. The system includes a storage tank 20 from which about 10% to about 15% by weight of chocolate liquor will be delivered to a mixer 26, and a storage tank 22 from which about 15% to about 25% by weight of cocoa butter will be delivered to the mixer 26, in keeping with step (a) described above.

A hopper or storage vessel 24 is shown, from which about 15% to about 55% by weight of a first quantity of sugar is delivered also to the mixer 26. That delivery of the first quantity of sugar is shown at 25, and is in keeping with step (b), described above.

A second quantity of sugar, in the amount of 5% up to about 30% by weight is delivered to a further mixer 30, in keeping with step (c), and is shown at 27.

In any event, the total amount of sugar delivered at 25 and 27 for incorporation into the edible anhydrous chocolate-based fat system of the present invention will be in the range of from about 45% to about 60% by weight thereof. Moreover, at least the second quantity of sugar delivered at 27 is granulated sugar, and may be delivered from another storage vessel or hopper (not shown), and may have a different coarseness than the sugar which is delivered to the mixer 26, as shown at 25.

In keeping with step (d) of the present invention, the first quantity of sugar together with the chocolate liquor and cocoa butter are mixed together in mixer 26, and then are conched to a predetermined degree of fineness in conching machine 28. Thus, there is delivered a conched chocolate pre-mix at 29, to a further mixer 30.

In keeping with step (e) described above, the second quantity of sugar which is added at 27 to the mixer 30, is mixed together with the chocolate pre-mix delivered at 29 to the mixer 30. However, the mixing step taken in step (e) is carried out at a temperature in the range of about 5° C. to about 30° C., so as to produce a cool anhydrous chocolate-based fat system having the specific, predetermined formulation with about 10% to about 15% by weight of chocolate liquor, about 15% to about 25% by weight of cocoa butter, and about 45% to about 60% by weight of sugar. At no time during the production of edible anhydrous chocolate-based fat system in keeping with the present invention will the product be heated, especially after the second quantity of sugar is added at 27 and in keeping with step (e). This assures that the crystalline structure of the granulated sugar component—the second quantity of sugar which is added to the conched chocolate pre-mix—is not destroyed.

After step (e), where the second quantity of sugar as been added to the conched chocolate pre-mix, and mixed together at a temperature of about 5° C. to about 30° C. so as to produce a cool anhydrous chocolate-based fat system, the fat system is delivered to a discrete particle manufacturing means so as to produce discrete particles of the anhydrous chocolate-based fat system. The operation of the discrete particle manufacturing means is carried out at a temperature of about 5° C. to about 30° C.

The discrete particle manufacturing means may be a chocolate mold machine 34, in which molded particles or chunks, such as chocolate chips or the like, are produced. The specific operation of the chocolate mold machine 34 is beyond the scope of the present invention; however, as noted above, the sizing of the piping, pumps, nozzle orifice, as they may be employed in or ancillary to the chocolate mold machine 34, must be such as to accommodate the granulated sugar component of the chocolate-based fat system of the present invention without damage to the equipment, or without destroying the granularity of the sugar component thereof.

The discrete particle manufacturing means may also comprise a machine which includes a spreader for spreading the cool anhydrous chocolate-based fat system on a conveyor belt, and a cutting or scoring means which usually comprises a series of knives, so as to form chunks or flakes. That machine is shown generally at 32, and the details of the flake or chunk making machine 32 are outside the scope of the present invention but are well known to those skilled in the art.

It will be understood that the flake or chunk making machine 32, and the chocolate mold 34, may not necessarily both be present; neither may each of them work simultaneously if they are both present.

Finally, and in any event, in keeping with step (g) described above, the discrete particles are removed for further handling, and/or storage, and/or shipping, in a suitable facility therefor shown generally at 36.

If necessary, after the conched chocolate pre-mix has been made in step (d), and is delivered from the conching machine 28 at 29 to the mixer 30, the conched chocolate pre-mix may be cooled so as to bring its temperature to a temperature of about 5° C. to about 30° C., so that when the second quantity of sugar is added as shown at 27 to the mixer 30, the temperature of the resultant mix is in the range of about 5° C. to about 30° C., and the crystalline structure of the granulated sugar component of the chocolate-based fat system is not destroyed.

Typically, the mixer 30 is a dry blender.

As previously noted, the second quantity of sugar which is added at 27 may have been saturated by an additional sweet flavor, which may come as a consequence of processing a chosen essential oil together with the granulated sugar of the second quantity of sugar to be added to the chocolate-based fat system, through a centrifugal pump. Otherwise, the granulated sugar many come as a consequence of the centrifuging of a highly sweetened juice of a chosen flavor, all as discussed above.

There has been described an edible anhydrous chocolate-based fat system which has a significant granulated sugar component, with all of the remaining ingredients of the chocolate-based fat system having been conched. The granulated sugar component may further be utilized as a vehicle to infuse an additional sweet flavor into the chocolate-based fat system of the present invention. If so, the granulated sugar component may be saturated by a chosen essential oil, or it may come as a consequence of removing the moisture from a highly sweetened juice of a chosen flavor.

A process for the preparation of an edible anhydrous chocolate-based fat system has been described, and a typical arrangement of machinery on which the process may be carried out has been shown.

Throughout the present discussion and the appended claims, use of the word "about" is meant to indicate that the described ranges for the addition of constituent components, or for operating temperature, are generally as described but need not necessarily be exactly precise, as will be well known to persons skilled in the confectionary arts and particularly those relating to the production of chocolate.

Other modifications and alterations may be used in the design and manufacture of the apparatus of the present invention without departing from the spirit and scope of the accompanying claims.

Throughout this specification and the claims which follow, unless the context requires otherwise, the word "comprise", and variations such as "comprises" or "comprising", will be understood to imply the inclusion of a stated integer or step or group of integers or steps but not to the exclusion of any other integer or step or group of integers or steps.

What is claimed is:

1. An edible anhydrous chocolate-based fat system which may be molded in a mold or spread onto a belt for manufacture into flake or chunk products;

wherein said edible anhydrous chocolate-based fat system comprises from 0 to 2% by weight of water, from about 10% to about 15% by weight of chocolate liquor, from about 15% to about 25% by weight of cocoa butter, and from about 45% to about 60% by weight of sugar;

wherein a portion of said sugar component, which is from about 5% to about 30% by weight of said edible anhydrous chocolate-based fat system, is granulated sugar; and wherein the remaining about 15% to about 55% by weight of said sugar component has been conched together with said 0 to 2% by weight of water, said about 10% to 15% by weight of chocolate liquor, and said about 15% to 25% of cocoa butter.

2. The edible anhydrous chocolate-based fat system of claim 1, further comprising at least one additional food ingredient chosen from the group consisting of milk solids, milk fat, vanilla, salt, lecithin, and mixtures thereof;

wherein said at least one additional food ingredient is conched together with said remaining, about 15% to about 55% by weight of said sugar component, said 0 to 2% by weight of water, said about 10% to 15% by weight of chocolate liquor, and said about 15% to 25% of cocoa butter.

3. The edible anhydrous chocolate-based fat system of claim 1, wherein said granulated sugar portion has been saturated by an additional sweet flavor, so as to infuse said edible anhydrous chocolate-based fat system with said additional sweet flavor.

4. The edible anhydrous chocolate-based fat system of claim 3, wherein said granulated sugar portion has been saturated by an essential oil chosen from the group of essential oils consisting of orange, lemon, almond, vanilla, cappuccino flavor, rose flavor, cherry, raspberry, strawberry, peach, mocha flavor, and combinations thereof.

5. The edible anhydrous chocolate-based fat system of claim 4, wherein said granulated sugar portion has been saturated by said chosen essential oil by having been processed through a centrifugal pump together with said granulated sugar portion.

6. The edible anhydrous chocolate-based fat system of claim 3, wherein said granulated sugar portion has been saturated by a flavor chosen from the group consisting of orange, lemon, avocado, passion fruit, mango, kiwi, cherry, raspberry, strawberry, peach, and combinations thereof, by mixing granulated sugar with a juice of the chosen flavor so as to derive a highly sweetened juice, and then centrifuging the highly sweetened juice so as to remove the moisture therefrom and so as to derive a flavored granulated sugar for use as said granulated sugar portion.

7. The edible anhydrous chocolate-based fat system of claim 1, wherein said chocolate-based fat system is intended for incorporation into baked flour goods and flour confections, or ice cream, and is produced in the form of flakes or chunks.

8. An edible anhydrous chocolate-based fat system which may be molded in a mold or spread onto a belt for manufacture into flake or chunk products;

wherein said edible anhydrous chocolate-based fat system comprises from 0 to 2% by weight of water, from about 25% to about 40% by weight of cocoa butter, and from about 45% to about 60% by weight of sugar;

wherein a portion of said sugar component, which is from about 5% to about 30% by weight of said edible anhydrous chocolate-based fat system, is granulated sugar; and wherein the remaining about 15% to about 55% by weight of said sugar component has been conched together with said 0 to 2% by weight of water, and said about 25% to 40% of cocoa butter.

9. The edible anhydrous chocolate-based fat system of claim 8, further comprising at least one additional food ingredient chosen from the group consisting of milk solids, milk fat, vanilla, salt, lecithin, and mixtures thereof;

wherein said at least one additional food ingredient is conched together with said remaining about 15% to 55% by weight of said sugar component, said 0 to 2% by weight of water, and said about 25% to 40% of cocoa butter.

10. The edible anhydrous chocolate-based fat system of claim 8, wherein said granulated sugar portion has been saturated by an additional sweet flavor, so as to infuse said edible anhydrous chocolate-based fat system with said additional sweet flavor.

11. The edible anhydrous chocolate-based fat system of claim 10, wherein said granulated sugar portion has been saturated by an essential oil chosen from the group of essential oils consisting of orange, lemon, almond, vanilla, cappuccino flavor, rose flavor, cherry, raspberry, strawberry, peach, mocha flavor, and combinations thereof.

12. The edible anhydrous chocolate-based fat system of claim 11, wherein said granulated sugar portion has been saturated by said chosen essential oil by having been processed through a centrifugal pump together with said granulated sugar portion.

13. The edible anhydrous chocolate-based fat system of claim 10, wherein said granulated sugar portion has been saturated by a flavor chosen from the group consisting of orange, lemon, avocado, passion fruit, mango, kiwi, cherry, raspberry, strawberry, peach, and combinations thereof, by mixing granulated sugar with a juice of the chosen flavor so as to derive a highly sweetened juice, and then centrifuging the highly sweetened juice so as to remove the moisture therefrom and so as to derive a flavored granulated sugar for use as said granulated sugar portion.

14. The edible anhydrous chocolate-based fat system of claim 8, wherein said chocolate-based fat system is intended for incorporation into baked flour goods and flour confections, or ice cream, and is produced in the form of flakes or chunks.

* * * * *